UNITED STATES PATENT OFFICE.

JOHN A. CULLEN, OF WASHINGTON, DISTRICT OF COLUMBIA.

PROCESS OF TREATING ALKALI-METAL-SALT MIXTURES.

1,363,091. Specification of Letters Patent. Patented Dec. 21, 1920.

No Drawing. Application filed March 26, 1919. Serial No. 285,298.

*To all whom it may concern:*

Be it known that I, JOHN A. CULLEN, a citizen of the United States, residing at Washington, District of Columbia, have invented certain new and useful Improvements in Processes of Treating Alkali-Metal-Salt Mixtures, of which the following is a specification.

This invention relates to a process intended for the treatment of alkali metal salt mixtures, especially such as contain, for example, the sulfates, chlorids, carbonates and bicarbonates of potassium and sodium, to recover therefrom commercial values both as primary products and as by-products.

The process is intended particularly for the treatment of salt lakes or desiccated brines, occurring principally in Nebraska, New Mexico, Nevada and California, deposits which carry large amounts of values in the form of potassium and sodium compounds. Up to the present time, it has been the practice, particularly in Nebraska, to simply concentrate the brine without effecting a separation of the various components, thereby producing a crude product valuable only for fertilizing purposes because of the potash content.

According to the process hereinafter set forth, high grade potassium compounds suitable for use in the arts and sciences are obtained from these salt deposits and in addition a valuable by-product, specifically caustic soda, is recovered.

These natural brines are all alkaline in reaction although they vary considerably in composition; but despite the variability in composition, it is peculiar that if the sulfate and chlorin content be calculated to the corresponding potassium salt, there is still an excess of potassium over these acid radicals, and to properly form a hypothetical combination it is necessary to combine the excess of the potassium with either part of the carbonate or bicarbonate radical. Usually the chlorine content is low, averaging only about 2 to 3% of the total solids. It is too low in fact to attempt a separation and too low to be considered in the recovery process unless a chlorid is subsequently added in the manner and for the purpose hereinafter stated. A large percentage of the potassium is combined as the carbonate or bicarbonate, and since the solubilities of these and of the corresponding sodium salts are so nearly the same, fractional separation is impossible. The result has been that although many attempts have been made to separate these salts as they exist in solution, they have all, so far as I know, been failures.

The present invention comprises in its broad aspect the treatment of a solution of the salt mixture with an agent which will precipitate the carbonates, the concentration of the solution from which the precipitates have been removed with the addition, either before or during concentration, of a predetermined amount of a substance which will furnish enough at least of an acid radical to insure that all of the potassium present in the salt mixture is satisfied with respect to that radical, and fractionally crystallizing out the potassium salts formed.

More specifically, the process comprises causticizing the solution of the salt mixture with lime, and thereby precipitating the carbonate as calcium carbonate, concentrating the solution with the addition of a salt, such as a sulfate, chlorid or nitrate, or a mixture of two or all of these, and by fractional crystallization recovering the potassium salts. From the mother liquor, after separation of the potassium salts, a useful by-product such as caustic soda is recovered.

In the course of a large number of tests, I have found that by causticizing the solution of the salt mixture with lime and thereby precipitating the carbonates and bicarbonates, the system is simplified and that through the formation of the highly soluble hydroxids, a separation is made possible, and, further, that upon the addition of a suitable salt such as sodium sulfate, sodium chlorid or sodium nitrate in an amount in excess of the theoretical amount necessary to furnish enough of the acid radical to hypothetically combine with the potassium which is in excess of that already hypothetically combined with the total amount of sulfate in solution, an almost complete separation of the potassium is made and is recoverable as a valuable salt by concentration and crystallization. An excess of the salt is necessary, for it has been found that the stable solid which first crystallizes upon concentration is glaserite, a double sulfate of potassium and sodium having the formula $3K_2SO_4.Na_2SO_4$. This salt continues to form until practically all of the sulfates have crystallized. It is therefore necessary to make an allowance for this phenomenon in the calculations.

Contrary to the belief of most chemists, the addition of calcium hydroxid to an alkali metal sulfate solution does not precipitate calcium sulfate. Ordinarily calcium hydroxid is much less soluble than calcium sulfate, and in any system which contains alkali metal sulfates, if calcium hydroxid be added, any alkaline hydroxid which forms greatly lowers the solubility of the calcium hydroxid, so that it is always the most insoluble compound and therefore remains or precipitates as such.

In carrying out the process of my invention, I first carefully analyze the salt mixture. This may be done either before or after the precipitation of the carbonates and bicarbonates, but I prefer to analyze the solution for carbonates and bicarbonates before the addition of the precipitating agent, in order to get an accurate estimate of the amount of lime necessary. Since the precipitated calcium carbonate can be calcined and used over again, I prefer to analyze the solution for potassium, sulfates and chlorin after the addition of the lime, as the reused lime will carry some values in potassium and sodium which will be returned therefore to the system. Consequently, an analysis after the lime is added will be more accurate and will of course give better results.

After the carbonates and bicarbonates have been precipitated by the calculated amount of the slaked lime and the necessary analysis made for the potassium, sulfates and chlorin content, a predetermined amount of a salt, preferably the sulfate or chlorid of sodium, is added. As before stated, this amount should be in excess of the amount theoretically required to satisfy the potassium in the solution not already combined with the acid radical of the added salt.

Assuming that sodium sulfate is employed, the amount required to combine with all of the potassium may be readily calculated in the manner presently to be described. It is assumed for the purpose of illustration that the analysis (which is typical) of the brine, after precipitation of the carbonates and bicarbonates, is as follows, in grams per liter:

Potassium (K) _____ 26.886
Sodium (Na) _____ 23.871
Sulfates ($SO_4$) _____ 20.812
Chlorin (Cl) _____ 3.325
Hydroxyl ions (OH) _____ 20.400

Since potassium and the sulfate radical combine in the direct proportion of their molecular weights, namely 78.2 to 96.07, respectively, to form potassium sulfate, $K_2SO_4$, it can be readily calculated which radical is in excess of the other, and the further calculations can then be made accordingly. In this instance, the potassium is in excess of the sulfate. Since the two radicals combine in direct proportion to their molecular weights, the equation is:

$$m : m' = x : y$$

in which—
  $m$ = the molecular weight of the two atoms of potassium,
  $m'$ = the molecular weight of the sulfate radical,
  $x$ = the amount of potassium which will combine with the sulfate radical, and
  $y$ = the amount of sulfate in solution.

Transposing the equation, $$my = m'x$$

or, $$x = \frac{my}{m'}$$

Substituting, $$x = \frac{78.2 \times 20.812}{96.07} \text{ grams.}$$

Whence, $x = 16.941$ grams of potassium hypothetically combined which, added to the $SO_4$ content gives 37.753 grams of potassium sulfate.

Subtracting the amount of potassium found from the total amount of potassium in solution, leaves 9.945 grams for which enough sodium sulfate must be added according to the following formula:—

$$n : n' = y : x,$$

wherein:
  $n$ = the molecular weight of two atoms of potassium,
  $n'$ = the molecular weight of sodium sulfate,
  $y$ = the amount of potassium to be combined, and
  $x$ = the amount of sodium sulfate required.

Transposing the formula:

$$n'y = nx$$

or, $$x = \frac{n'y}{n}$$

Substituting, $$x = \frac{142.07 \times 9.945}{78}$$

Whence, $x = 18.067$ grams of sodium sulfate required to furnish enough of the radical $SO_4$ to theoretically combine with the balance of the potassium.

The amount of $SO_4$ to be furnished is then calculated by multiplying the amount of sodium sulfate added by the factor .6762, representing the $SO_4$ value in the salt $Na_2SO_4$. In this instance, the amount will be 12.217 grams which, added to the potassium with which it will combine, namely 9.945 grams, gives 22.162 grams, which, added to the hypothetical potassium sulfate originally in solution, namely 37.753 grams, gives 59.915 as the amount of potassium sulfate now in solution.

As before stated, the stable solid which crystallizes from this system upon concentration and cooling is the double sulfate of potassium and sodium having the formula $3K_2SO_4.NaSO_4$. Therefore, there must be yet added to this solution an additional amount of sodium sulfate in order that this salt may be formed. This is readily calculated from the formula:

$$3a:b=y:x,$$

wherein:
$a=$ the molecular weight of potassium sulfate,
$b=$ the molecular weight of sodium sulfate,
$y=$ the known amount of hypothetical potassium sulfate, and
$x=$ the amount of sodium sulfate required.

Transposing the equation:

$$3ax=by$$

or, $$x=\frac{by}{3a}.$$

Substituting, $$x=\frac{142.07 \times 59.915}{522.81}$$

Whence, $x=16.281$ grams of sodium sulfate required to form the double salt which, added to the amount necessary to furnish sufficient sulfate ions for the potassium, namely 18.067, gives 34.348 grams as the total amount of sodium sulfate to be added.

The calculated amount of sodium sulfate is preferably added before any solid crystallizers from the solution being concentrated. Evaporation is then proceeded with, and it is preferred that an evaporating system with salt-traps attached be used, so that as the crystals form and precipitate, they can be readily removed. It is also preferable, though not necessary, that the evaporation be performed in a vacuum system, so that the carbon dioxid of the air is excluded and contamination of the caustic mother-liquor prevented.

When the concentration reaches 25.5° to 26° B. (measured hot), salt crystals appear and continue to form as long as the evaporation is continued. When the concentration reaches 30° to 32° B., about 50 to 55% of the total amount of potassium in the solution is precipitated. When the concentration reaches 35° to 36° B., about 70 to 75% is recovered and when it reaches 40° about 85 to 90% is recovered. If the liquor then be allowed to cool, practically all of the potassium remaining in solution is recovered.

As a matter of fact, the evaporation can be stopped and the mass allowed to cool when the concentration reaches 35° or 36° B., with practically the same results as when the liquor is evaporated to 40° B. However, by continuing the evaporation to 40° B. before cooling, a slightly better yield is obtained. I have observed that up to 30 to 32° B., the only stable solid is the double sulfate, glaserite, but that with increasing concentration of the sodium ions, small amounts of an isomorphous sodium sulfate are formed and the percentage of potassium in the product which forms above this concentration decreases slightly. The addition therefore of a slight excess of sodium sulfate over the amount actually calculated does no good and only serves to form an additional amount of the isomorphous sodium sulfate. Also, with increasing concentration of the solution, the amount of sodium hydroxid adhering to the crystals increases, although if drained properly the amount will not be over 2 or 3%.

In freeing the crystals from the alkaline mother-liquor, I prefer to centrifuge the same and wash them once or twice with small amounts of water. This wash water can then be used for slaking the lime, so that all values are returned to the system. After washing, the resulting product is a high grade salt carrying 40 per cent or more of $K_2O$, with but a trace of alkalinity.

The caustic mother-liquor is decanted or filtered off and, if desired, evaporated to any suitable concentration. Since the original brine contains some organic matter which colors the solution a deep brown, it is preferable to evaporate the caustic resulting from the foregoing process to a point where but a small amount of water is present. By this means the organic matter is decomposed and coagulates around the sides of the evaporator. The result is that a very high grade and pure white caustic soda is obtained.

While in giving the foregoing example, described so much in detail as to enable any one in the least skilled in the art to carry out the process, I have referred to specific substances, amounts and conditions, it is to be understood that I do not thereby intend to limit myself, except as purposely intended in the appended claims, since I fully realize that it is possible to carry out the process with some degree of success with considerable variation within the knowledge and contemplation of chemists familiar with the treatment of similar materials.

I have not herein specifically described and claimed the treatment of the carbonate-freed solution of the salt mixtures with sodium chlorid, this being the subject matter of a companion application, Ser. No. 285299, filed of even date herewith.

By the term alkali salt as used in some of the appended claims to describe the salt which is used to furnish the acid radical for the unsatisfied portion of the alkali metal content of the salt mixture, it is to be understood that it is intended to include also salts of the alkaline earth metals.

Also, I have used in the claims the word "carbonates." This term is intended to include also the bicarbonates which are present.

While in the claims the step of precipitating the carbonates is described previous to the step of adding the salt, I do not thereby intend to limit myself to that particular sequence, since in carrying out the process the precipitation of the carbonates may occur during or after the addition of the salt.

I claim:

1. The process of treating potassiferous solutions of salt-mixtures containing carbonates, which comprises precipitating the carbonates, adding to the solution a soluble sulfate in excess of the amount required to furnish the sulfate radical for the potassium content of the mixture not already combined with the radical, and recovering the potassium salt by concentration and crystallization.

2. The process of treating solutions of salt-mixtures containing potassium sulfate and carbonates, which comprises precipitating the carbonates, adding sodium sulfate to the solution in excess of the amount required to furnish the sulfate radical for the potassium content of the mixture not already combined as the sulfate, and recovering the potassium sulfate by concentration and crystallization.

3. The process of treating potassiferous solutions of salt mixtures containing carbonates, which comprises precipitating the carbonates, concentrating the solution and adding during concentration a soluble sulfate in excess of the amount required to furnish the sulfate radical for the potassium content of the salt mixture not already combined with the radical, and crystallizing out the potassium salt.

4. The process of treating solutions of salt mixtures containing sulfates and carbonates of potassium and sodium, which comprises precipitating the carbonates with lime, concentrating the solution and adding sodium sulfate during concentration in excess of the amount required to furnish the sulfate radical for the potassium content of the mixture not already combined as the sulfate, and crystallizing out the double sulfate of potassium and sodium formed.

5. The process of treating solutions of salt mixtures containing sulfates and carbonates of potassium and sodium, which comprises precipitating the carbonates with lime, adding sodium sulfate to the solution in excess of the quantity required to furnish enough of the sulfate radical to satisfy the potassium content of the mixture not already combined as the sulfate, and recovering the double sulfate of potassium and sodium formed by concentration and crystallization.

6. The process of treating solutions of natural potassiferous brines containing carbonates, which comprises precipitating the carbonates, adding to the solution a soluble sulfate in excess of the amount required to furnish the sulfate radical for the potassium content of the mixture not already combined with the radical, and recovering the potassium salt formed.

7. The process of treating solutions of natural brines containing sulfates and carbonates of potassium and sodium, which comprises causticizing with lime and thereby precipitating the carbonates, adding sodium sulfate to the solution in excess of the quantity required to furnish enough of the sulfate radical to satisfy that portion of the potassium not already combined as the sulfate, and recovering the potassium salt formed.

8. The process of treating solutions of natural brines containing sulfates and carbonates of potassium and sodium, which comprises causticizing with lime and thereby precipitating the carbonates, adding sodium sulfate to the solution in excess of the quantity required to furnish enough of the sulfate radical to satisfy that portion of the potassium not already combined as the sulfate, and recovering the double sulfate of potassium and sodium formed by concentration and crystallization.

9. The process of treating solutions of natural brines containing sulfates and carbonates of potassium and sodium, which comprises causticizing with lime and thereby precipitating the carbonates, adding sodium sulfate to the solution in excess of the quantity required to furnish enough of the sulfate radical to satisfy that portion of the potassium not already combined as the sulfate, concentrating to 32°–40° B. and crystallizing out the double sulfate of potassium and sodium formed.

In testimony whereof I affix my signature.

JOHN A. CULLEN.